GAUGE CONTROL APPARATUS FOR MANUFACTURING WEB MATERIAL

Filed June 26, 1961 3 Sheets-Sheet 1

INVENTORS
CHARLES NELSON JOLLIFFE
JOHN A. PARKINS

BY Herbert M. Wolfson
ATTORNEY

GAUGE CONTROL APPARATUS FOR MANUFACTURING WEB MATERIAL
Filed June 26, 1961 3 Sheets-Sheet 2
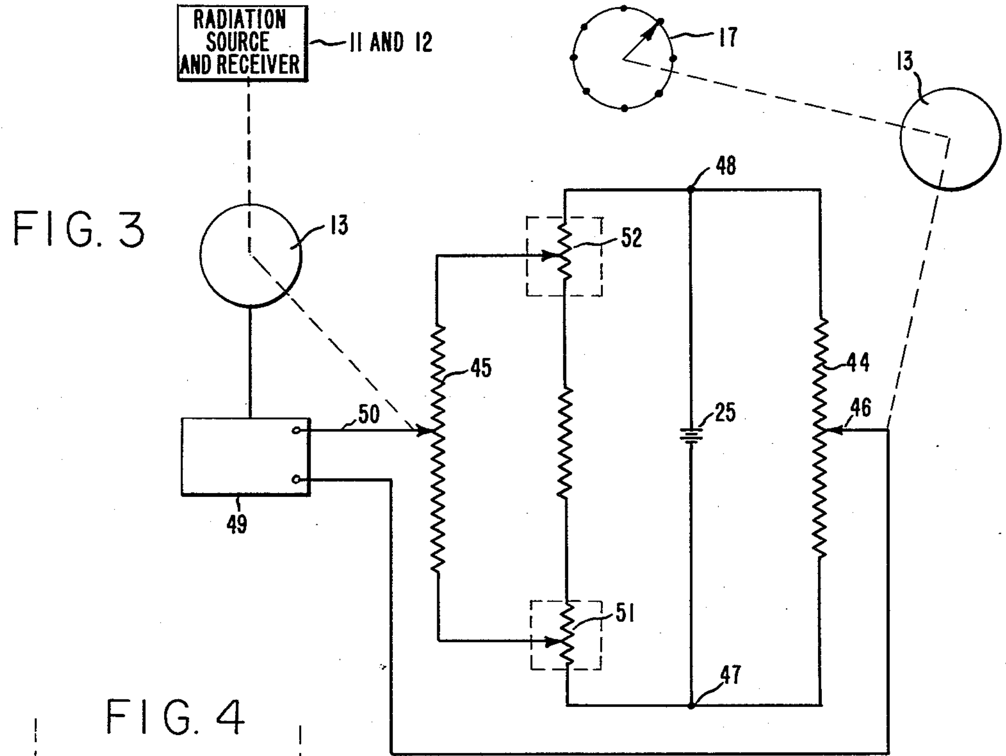
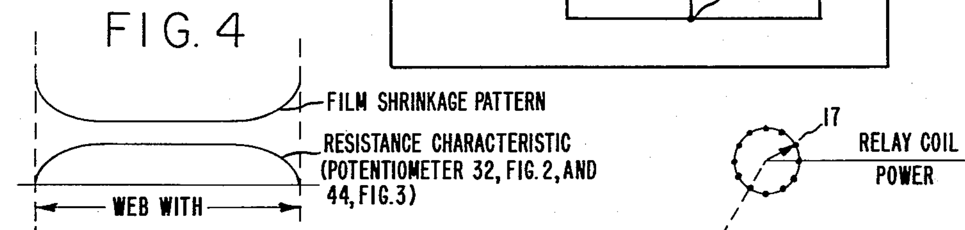
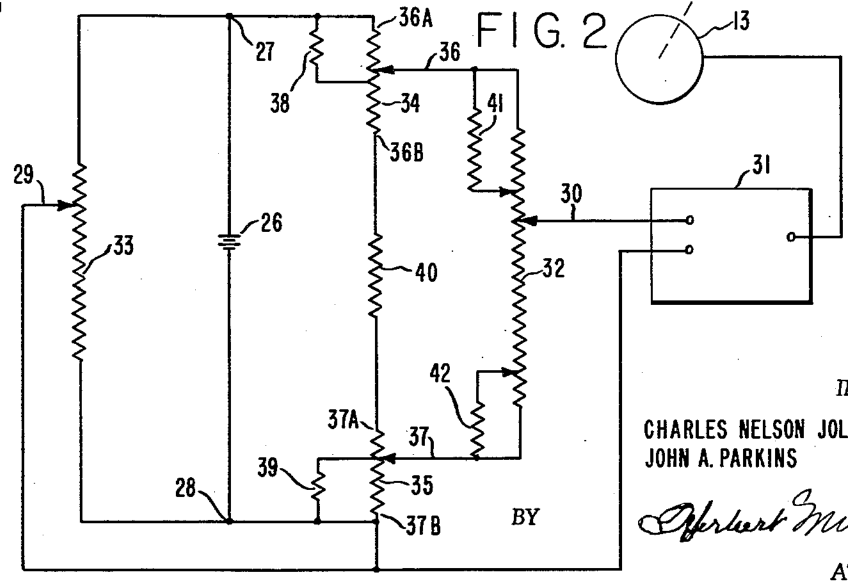
INVENTORS
CHARLES NELSON JOLLIFFE
JOHN A. PARKINS
BY
Herbert M. Wolfson
ATTORNEY GAUGE CONTROL APPARATUS FOR MANUFACTURING WEB MATERIAL
Filed June 26, 1961 3 Sheets-Sheet 3
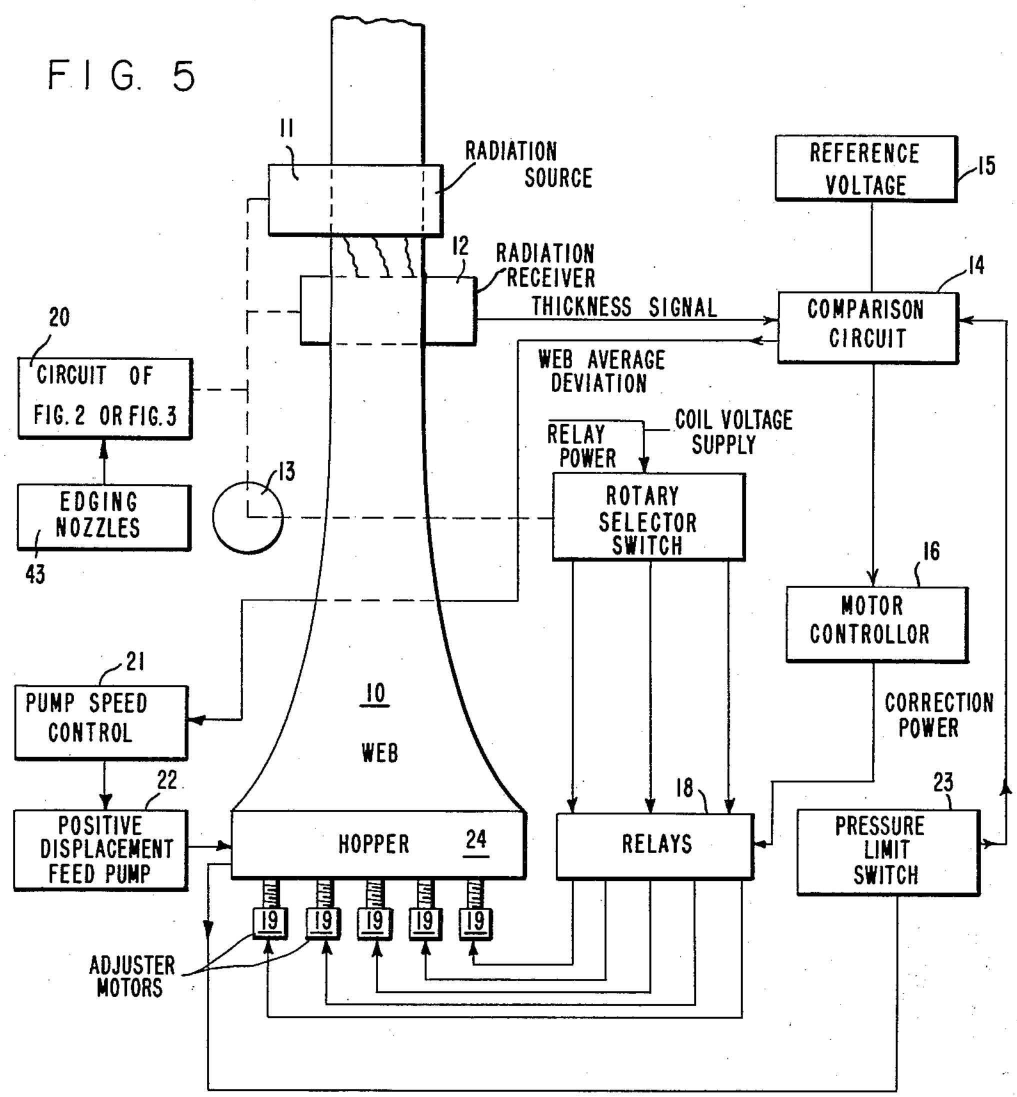
INVENTORS
CHARLES NELSON JOLLIFFE
JOHN A. PARKINS
BY Herbert M. Wolfson
ATTORNEY United States Patent Office 3,122,783

Patented Mar. 3, 1964

1

3,122,783

GAUGE CONTROL APPARATUS FOR MANUFACTURING WEB MATERIAL

Charles Nelson Jolliffe, Circleville, Ohio, and John A. Parkins, Newark, Del., assignors to E. I. du Pont de Nemours and Company, Wilmington, Del., a corporation of Delaware Filed June 26, 1961, Ser. No. 119,500
5 Claims. (Cl. 18—2)

This invention relates to an automatic gauge control system useful in the manufacture and processing of web materials. More particularly, it relates to a control system that is useful in manufacturing web materials that have a variable relationship between the extruded dimensions and the finished dimensions.

As is known, the production of plastic film involves the use of a hopper adapted to contain the plastic as a viscous liquid (usually in the molten state) along with extrusion means in the form of orifice-defining lips integral with the hopper. A pump is employed to force the plastic through the lips of the hopper to form the film. The pressure on the material is due to the action of the pump as well as the size of the opening defined by the lips. In the production of extruded film with such apparatus, variations in thickness across the width of the film are not uncommon. These may be due to uneven wear of the lips of the extruder or deficiencies in other mechanical parts of the extruder or to variations in the amount of the extruded material fed to the lips at any particular point across the width. In the manufacture of plastic films such as cellophane, oriented polyester films such as Mylar [1] polyester film, and stretched polyolefin films (polyethylene film, polypropylene film, etc.), these thickness variations due to machine problems are further complicated by changes in the width of the material from the point of extrusion to the point of winding up the finished material. Cellophane tends to shrink as it changes its chemical constitution during processing. Stretching of the other films in the longitudinal or transverse direction to improve physical properties tends to change the width of the films. This shrinkage, in the case of cellophane, and width alteration, in the case of the other films, usually does not occur uniformly across the width of the web. Hence, the position of a deviation in the thickness of the material at the windup end does not necessarily correspond directly to that position at the extruder portion of the machine. Experience, however, may teach the operator the location on the extruder at which an adjustment should be applied to correct a specific deviation band observed at the windup end.

Manually controlled systems have been used to adjust these deviations. However, such systems require constant personal attention and are necessarily expensive to operate. Manufacturers in this field have attempted to adopt automatic thickness control systems. These systems involve a direct response between the thickness-sensing element near the windup end of the machine and the operation of an adjusting element at the extruder. These systems make no allowance for the non-uniform change in width of the material. These systems do not take into account the nature of the specific material being processed that may dictate the place on the extruder that the adjustment must be applied to correct a specific deviation band at the windup end of the machine.

An object of this invention is to provide an automatic gauge control system that can be preset and adjusted if desired to compensate for the width narrowing or widening of a moving web and to compensate for any other variations that may be peculiar to the particular material being manufactured. Other objects will appear hereinafter.

[1] Registered trademark of E. I. du Pont de Nemours and Company.

2

The objects are accomplished by employing in an automatic gauge control system composed of means for transversely scanning the web, the scanning means adapted to determine the deviation of the web thickness from a reference standard at a particular location on the web and means responsive to the deviation determination adapted to adjust the thickness of the web, said adjustment means disposed at the web-forming position and at a plurality of locations across the width of the web, the improvement wherein variable resistor means are interposed between the scanning or thickness-sensing means and the adjustment means, the resistor means adapted to vary the location on the adjustment means at which the adjustment means reacts to the output of the scanning means at any partiucular location of its transverse scan.

The invention will be more clearly understood by referring to the following drawing wherein:

FIGURE 2 is a partial circuit diagram including the critical resistor of the invention and means for controlling edge effects in the apparatus of the invention;

FIGURE 3 is a partial circuit diagram showing the basic elements of the invention; and FIGURE 4 is an illustration of a typical relationship between a transverse shrinkage curve and the resistance characteristics of the critical element of the invention.

FIGURE 5 is a block diagram showing the coaction among the extruder, the extruded sheet, the sensing means and the adjustment means.

Figure 1:
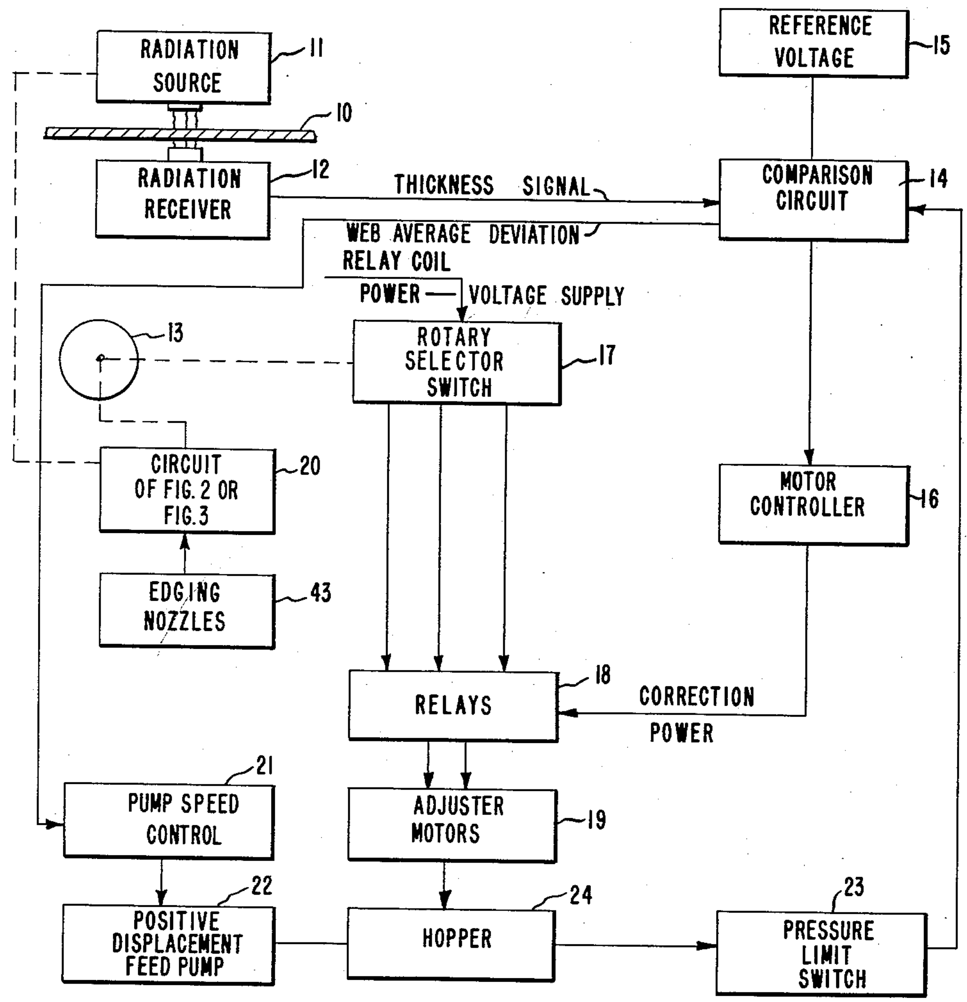
FIGURE 1 is a block diagram illustrating a preferred embodiment of the invention.

Referring to FIGURES 1 and 2, a radiation source 11 and receiver 12 are caused to scan back and forth across the moving web 10 by motor 13. Receiver 12 has an output which varies with the thickness of web 10. The radiation source and receiver may be any of several forms known to the art for determination of the thickness of objects by attenuation or absorption of radiation. For example, beta-rays from a radiocative source, X-rays, or optical radiation such as ultraviolet, visible or infrared light, may be employed as the radiation source. The signal from the radiation receiver, which varies according to the thickness of the web, is compared in circuit 14 with an adjustable reference standard voltage from source 15. This comparison produces a signal which varies as the deviation of the thickness of the web from the preselected standard. The magnitude of the deviation is preferably sensed by a slide wire device coupled to a display device, such as a strip-chart recorder (not shown).

An electronic motor speed controller 16 (such as a "Thymotrol" speed controller, manufactured by the General Electric Company) receives the deviation signal and provides power to control the direction and speed of the adjuster motors according to the sign and magnitude of the thickness deviation. The selection of the appropriate adjuster motor is accomplished through a circuit controlled by the motor 13. A separate motor, not shown, drives the traversing thickness-sensing element 11 and 12. The motor 13 is mechanically coupled to the movable or rotatable contact of a multiple-pole rotary switch 17. Rotatable is used to define the arm which oscillates through a circular arc. As the thickness-sensing element 11 and 12 travels back and forth across the web, the rotary arm oscillates through a predetermined arc on rotary switch 17. The rotary arm is electrically coupled to a source of power to energize the appropriate one of relays 18 which are individually coupled to the adjuster motors 19.

The rotary switch, adjuster motors combination is equipped with relay switching devices so arranged that as the thickness-sensing device traverses toward the edge of the web all of the motor control relays 18 are actuated, but upon the return of the scan, the relays are inactive until the scan reaches about one-third the distance across the web. The operation is repeated at each end of the traverse. This is required to prevent doubling the correction, since the corrective action would not have been effective upon immediate reversal of the scan. The use of this arrangement, and the number of motors rendered inoperative is optional, dependent on the relative rate of web travel and the rate of scan, which determines the time lag between sensing and correction.

The resistance circuit 20 shown in greater detail in FIGURE 2 is supplied with a voltage from source 26, illustrated as a battery, between points 27 and 28, and connected to the input terminals of an amplifier 31 at points 29 and 30. The amplifier input drives motor 13 which is mechanically coupled to potentiometer 32 in such a way that the motor 13 adjusts potentiometer 32 in the direction required to bring the point 30 to the same voltage as point 29. Potentiometer 32 is a tapered resistor. The specific taper is determined from the representative film or web shrinkage pattern shown in FIGURE 4. Specifically, the taper is adjusted to provide a resistance characteristic that varies inversely with the shrinkage pattern of the web. The same motor 13 is also coupled to the rotating selector switch 17 which determines the time of operation of adjuster motors. In most cases, the greatest resistance per unit length in resistor 32 will appear at the center so that the voltage will be greatest at the ends and the movement of selector switch 17 will be correspondingly most rapid at the ends of its arc.

Potentiometers 34 and 35 serve as the means for maintaining the traversing mechanism over the web at all times. The voltages at 36 and 37 are determined by the settings along potentiometers 34 and 35, respectively. Potentiometers 34 and 35 are mechanically coupled (in an appropriate manner, not shown) to the edging nozzles 43 of a width-sensing device. Hence, the voltages at 36 and 37 are determined by the positions of the web edges. Point 36 is varied through its range (36A to 36B) as the sheet varies from its outer limit to its inner limit. The rotation of the selector switch reaches one end of its arc as point 29 reaches the voltage of point 36. Values in the circuit are selected so that this occurs as the gauge reaches the edge of the sheet. Similarly, point 37 controls the rotation of the selector of the rotary switch in the opposite direction. Resistors 38 and 39 are included to improve linearity of the relation between web edge locations and the voltages at 36 and 37, respectively. Limiting resistor 40 serves to limit the current, and correspondingly, the voltage between points 36 and 37. Resistors 41 and 42 can be used to make the voltage distribution across 32 non-uniform with less voltage change per degree of rotation near the extremes of the travel of potentiometer contact 30. This requires the motor speed to increase in order to keep the circuit balanced. Power to actuate the relays is transmitted to the rotary contact arm of rotary switch 17. It should be noted that by selecting appropriate values for resistors 41 and 42, the same non-uniformity effect as obtained with the tapered resistor 32 can be achieved. Hence, the variable resistor means to vary the speed of the reaction of the adjustment means can be either the preferred tapered resistor 32 or the combination of resistors 41 and 42 with a constant resistor at 32 or a combination of the two, the overall effect being to change the effective resistance of potentiometer 32 at the desired locations.

In the embodiment shown in FIGURE 1, optional elements to eliminate other deficiencies inherent in the system or created by the system are provided. These include the unit weight control system to reduce long-range drift in the average gauge of the web, and a hopper pressure control to assure uniform extrusion pressure as the lips are opened and closed in response to correction signals.

The unit weight control system comprises an electric drive motor 21 geared to the speed control of a positive-displacement continuously variable pump 22 which supplies the extrusion hopper 24. The control motor on this pump is actuated by the thickness deviation signal selected at several points distributed across the web. These signals are connected in parallel so that the net signal to the pump control for each traverse of the thickness-sensing element represents the average deviation across the web. The control is so coupled that it changes speed of the positive-displacement pump in the direction required to bring the average thickness back to the standard and nullify the deviation signal.

The hopper pressure control device comprises pressure-operated electric switch 23 which can be set to produce a signal if the pressure goes beyond certain arbitrary limits. A pressure higher than the selected limit produces a signal which is transmitted to the hopper motor relay in the voltage comparison circuit 14 which controls the closing motion of the hopper and cancels said signal by opening the circuit. A pressure which is lower than the limit would similarly render the lip-opening relay inactive.

Another possibility for the pressure control element incorporates control of the standardization bias, or reference voltage in the voltage comparison circuit 14 instead of cancelling the control signals, as described. In this case, a signal from the hopper pressure gauge indicating pressure above the selected limit causes an increase in the bias voltage such that the entire transverse thickness is increased, resulting in a general opening of all lips by an equivalent value, but without cancelling individual control signals.

Basically, the embodiment in FIGURE 1 provides a control apparatus in which the rate of scan of the thickness-sensing element is time-invariant and the rate of successive activation of the adjuster motors is variable. An alternative embodiment involves an apparatus wherein the rate of successive activation of the adjuster motors is time-invariant but the scan of the thickness-sensing element is variable. In both cases, the variation in the variable element is an inverse function of the shrinkage or width-narrowing pattern shown in FIGURE 4. FIGURE 3 will be used to show both embodiments.

To accomplish a variable relationship between the rate of scan and the rate of sequential operation of the hopper motors, either resistor 44 (32 in FIGURE 2) or 45 of FIGURE 3 has a resistance characteristic such that the voltage along the length of one or the other varies in a non-linear manner. As illustrated in FIGURE 3, resistor 44 may be symmetrically tapered from the center to the ends. The resistance per unit of length of the center portions is greater than the end portions. The extent of taper is chosen acording ot the transverse shrinkage pattern of the web. Alternatively, instead of using a tapered single resistance the effect may be accomplished by the use of parallel loading resistors (41 and 42 in FIGURE 2) to provide the proper change in voltage with displacement of the movable contact. The other embodiment to accomplish a non-linear relationship between the rate of scan and the rate of sequential operation of the adjuster motors, wherein the latter is constant, employs a non-linear resistor for 45 while 44 is linear.

In operation, with reference to FIGURE 3, motor 13 moves the rotor of switch 17 through its prescribed arc at a constant rate, then reverses its motion and again moves the rotor at a constant rate. This transmits energy to actuate the relay 18. Mechanically coupled to motor 13 is a sliding contact 46 which moves along resistance 44 according to the rotation of motor 13. A voltage is supplied between points 47 and 48 by a source illustrated as a battery 25. Movement of sliding contact 46 along resistance 44, changes the voltage at amplifier 49. This causes motor, not shown, to drive contact 50 along resistance 45 in order to return the voltage across the input of the amplifier to zero. The thickness-sensing element is mechanically coupled to contact 50 so that it moves accordingly. In the embodiment wherein resistor 44 is non-linear, the greater voltage change for a given distance of movement of 46 along 44 in the center portion where the resistance in greater will cause the motor coupled to the scanning device to move more rapidly at the central portion during the traverse across the web of the thickness-sensing element than it does at the edges where the shrinkage has been greatest. Accordingly, the resistance element 44 has a gradient with higher resistance in the central portion than at the ends to provide a response according to the transverse shrinkage pattern of the web. This is achieved by use of a single element slide wire with a tapered characteristic, or as noted hereinbefore, by the use of parallel loading resistors. If a linear characteristic is employed for resistance 44, then the non-linear relationship is provided for by use of a shaped or tapered resistor 45 in which the resistance is lower in the central portion, requiring a greater speed of the motor in order to maintain a zero potential difference across the input terminals of amplifier 49.

Optionally, the control system may be provided with potentiometers 51 and 52 coupled to an edge-sensing servo-mechanism as described hereinbefore to permit the scanning device to reach the edges of the web simultaneously with the rotation of the selector switch 17 reaching the end of its arc in event of sway or irregular shrinkage or stretching.

Having fully disclosed the invention, what is claimed is:

1. In an apparatus for extruding a web of material composed of a hopper adapted to contain said material for said web; extrusion means composed of orifice-defining lips disposed in integral relationship with said hopper adapted to extrude said material in the form of a web; a pump adapted to force said material through said lips of said extrusion means; windup means disposed distant from said extrusion means adapted to collect said web; adjustment means adapted to adjust the thickness of said web, disposed at said extrusion position and at a plurality of locations across the width of said web; means for transversely scanning the moving web, the scanning means disposed between said extrusion means and said windup means adapted to provide an output that is directly related to the deviation of the web thickness from a reference standard at any particular location across the width of the web; the improvement wherein control means responsive to the output of said scanning means adapted to activate the adjustment means at any particular location; and resistor means having a variable resistance across its length are interposed between said scanning means and said control means, adapted to vary the reaction of said control means to the output at any particular location on said scanning means.

2. An apparatus as in claim 1 wherein said interposed resistor means controls the voltage to said control means and is arranged so that the resistance per unit length at the center portion is greater than the resistance per unit length at the end portions whereby the rate of said control means and the adjustment means controlled by said control means is greatest at the locations adjacent the edges of said web.

3. An apparatus as in claim 1 wherein said interposed resistor means controls the voltage to said scanning means and is arranged so that the resistance per unit length at the center portion is less than the resistance per unit length at the end portions whereby the rate of said scanning means is slowest adjacent the edges of said web.

4. An apparatus as in claim 1 wherein the outputs of said scanning means are averaged for each traverse of said scanning means to provide an average output; and said average output is adapted to control the speed of said pump in a manner to bring the average thickness of the web back to the reference standard.

5. An apparatus as in claim 1 wherein control means are interposed between said output and said hopper adapted to control the pressure on said material at said extrusion means between pre-set pressure limits.

References Cited in the file of this patent

UNITED STATES PATENTS

| | | |
|---|---|---|
| 2,051,781 | Brown | Aug. 18, 1936 |
| 2,387,718 | Coleman | Oct. 30, 1945 |
| 2,566,854 | Rhodes | Sept. 4, 1951 |
| 2,800,590 | Gilman | July 23, 1957 |
| 2,923,971 | Nelson | Feb. 9, 1960 |
| 3,006,225 | Mamas | Oct. 31, 1961 |
| 3,015,129 | Hays et al. | Jan. 2, 1962 |

FOREIGN PATENTS

| | | |
|---|---|---|
| 1,047,276 | Germany | Dec. 24, 1958 |